United States Patent [19]
Hains

[11] Patent Number: 5,381,247
[45] Date of Patent: Jan. 10, 1995

[54] METHOD FOR REDUCING 2-COLOR MOIRE IN 4-COLOR PRINTING

[75] Inventor: Charles M. Hains, Altadena, Calif.

[73] Assignee: Xerox Corporation, Stamford, Conn.

[21] Appl. No.: 237,577

[22] Filed: May 3, 1994

[51] Int. Cl.⁶ .............................................. H04N 1/46
[52] U.S. Cl. ..................... 358/533; 358/536
[58] Field of Search ............... 358/536, 534, 533, 454, 358/456, 298, 458, 465, 466

[56] References Cited

U.S. PATENT DOCUMENTS

| | | | |
|---|---|---|---|
| 4,924,301 | 5/1990 | Surbrook | 358/534 |
| 5,045,931 | 9/1991 | Sakamoto | 358/534 |
| 5,155,599 | 10/1992 | Delabastita | 358/454 |

*Primary Examiner*—Scott A. Rogers

*Attorney, Agent, or Firm*—Robert Cunha

[57] ABSTRACT

A method of halftone printing in four colors using, for cyan, magenta and black, halftone screens that will result in screening angles of 15, 45 and 75 degrees, as is the standard process in the art, and a halftone screen for yellow that will result in screening angles of 0, +60 and −60 degrees. This combination will diminish the 2 color moiré patterns that result from the interaction between the yellow and one of the other colorants. The 0 and + or −60 degree screening angles are generated by using a screen that produces a four-centered cell having dots that are spaced to form hexagons, when the nearest neighbors of a central dot are connected by lines, as opposed to the conventional trapezoidal orientation.

2 Claims, 8 Drawing Sheets

*(Prior Art)*

METHOD FOR REDUCING 2-COLOR MOIRE IN 4-COLOR PRINTING

BACKGROUND OF THE INVENTION

In 4 color (cyan, magenta, yellow, black) printing, separating the axes of the cyan, magenta and black halftone screens by thirty degrees (15, 45 and 75 degrees) and using a hexagonal halftone screen for the yellow which has axis angles of 0, +60 and −60 degrees, to break up the moiré pattern which is produced by the yellow colorant in the prior art method.

In the typical 4-color printing prior art, four square halftone screens are produced which have angles of 0, 15, 45 and 75 degrees. Typically, the three most dominant colorants (cyan, magenta and black) are separated by 30 degrees which is the optimum separation for minimum moiré, and the last (yellow, which is least visible) is set to zero degrees. This typically gives an angle of 15 degrees between the yellow and two other colors, usually cyan and magenta. This results in a good print in most cases in that color moiré (repetitive patterns in what should be solid colors) caused by inaccurate registration of the various halftone dots in printing is minimized, but in cases where a high quality print is required, a close inspection will show that the yellow colorant set to zero degrees will beat against those 15 degrees away, cyan and magenta, to make an objectionable lower frequency moiré. These 2-color moiré patterns are then most noticeable in pinks, oranges, tans and greens. Also, the yellow screen is 45 degrees from the black, and this angle also is capable of producing moiré. A technique to break up these 2-color moiré patterns is needed to increase the quality of 4 color halftone pictures.

The axes of the screens are determined by connecting lines between each dot and its nearest neighbors. The screen angle is the measure of a screen axis with respect to the horizontal.

SUMMARY OF THE INVENTION

In this case the three dominant colors are set to angles of 15, 45 and 75 degrees, while the yellow colorant is halftoned with a hexagonal pattern that will result in angles of 0, +60 and −60 degrees. Thus, the yellow will be at odd angles and frequencies with respect to the other three colors, and the 2-color moiré will be reduced.

The suggested technique to break up these color moiré patterns is to replace the normal 0 degree yellow screen with a non-square periodic screen, for instance, a hexagonal yellow screen. In both digital and optical halftone technology, the screen dots are normally square. That is, the dots are aligned in a lattice with two perpendicular axes. Each dot is surrounded by four neighbouring dots at equal distances, producing two axes and quaternary symmetry. The screen angle is measured from the horizontal to the nearest axis. In comparison, in a hexagonal screen, each dot is surrounded by six neighbouring dots at equal distances, producing three axes separated by 60 degrees and senary symmetry. The dots are more tightly clustered in triangular groupings.

Using a hexagonal screen for the yellow results in the yellow being the same angle from each of the other screens. While the new yellow dot axes are now separated by 15 degrees from each of the other colors, they are more tightly packed and apparently less susceptible to moiré. The moiré is not eliminated, in fact some new moiré components are introduced, however the resultant moiré patterns are less visible. A further benefit is that the 45 degree angle from the black is avoided altogether.

If the traditional magenta, cyan and black scheme of 15, 75 and 45 degrees is maintained, the hexagonal yellow can be introduced with one of the axes at either 0 or 90 degrees. The scheme is still possible if any of the magenta, cyan, or black are interchanged, and also if the entire screen ensemble is rotated together by any angle.

In actual prints, the improvement of the 2-color moiré is most apparent in the reds and greens, and to a lesser extent in flesh colors and in the 3-pass and 4-pass blacks.

DETAILED DESCRIPTION OF THE INVENTION

Figure 1:
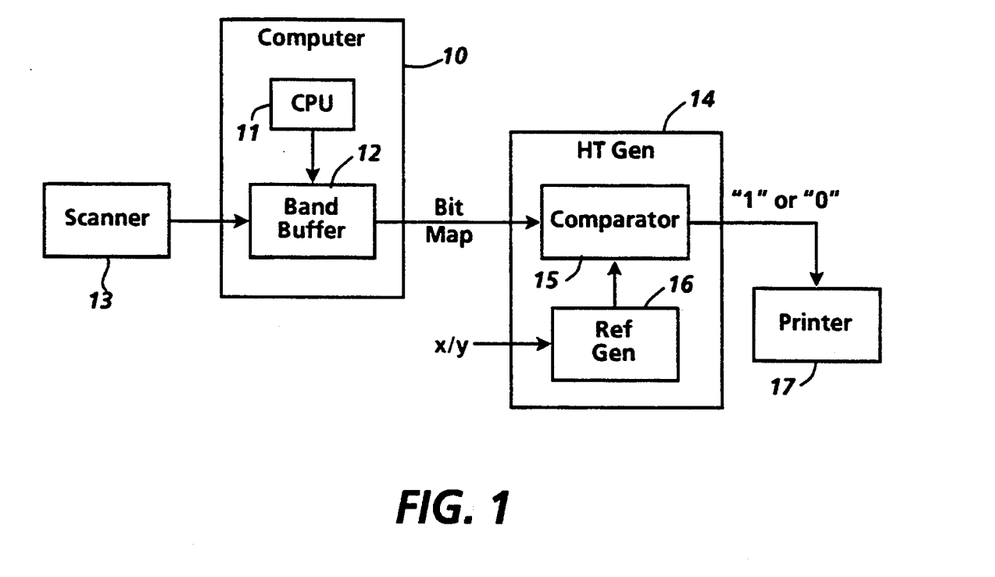
FIG. 1 is a block diagram of a color printing system.

FIG. 1 is a simplified block diagram of a typical color printing system. The CPU 11 of a computer 10 can generate graphics or backgrounds that are to be printed in color, and load them into a page or band buffer 12. In the alternative, a scanner 13 can generate the image data. The stored data is in the form of pixels, and is composed of a plurality of colors. For example, there may be four colors. Each color component of each pixel has a number of bits. For example, there may be eight bits per pixel for each color. This number of bits is used to describe the density of the associated colorant. Thus, a density of 0000 0000 is white while 1111 1111 is the most dense color that the colorant can produce. To print this image, the entire image is printed one color at a time. That is, one colorant is loaded into the printer 17 and the printer will scan the entire image, before starting over with the next colorant.

Figure 2:
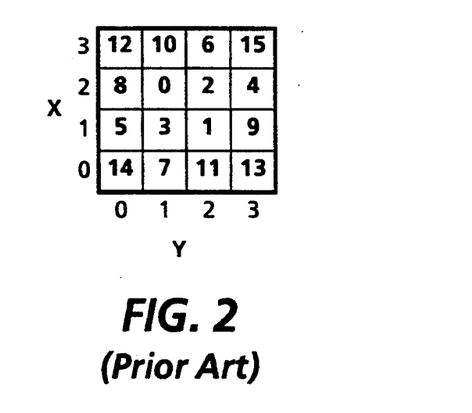
FIG. 2 is an example of a simple square halftone cell with its axes at 0 and 90 degrees having a single dot. The threshold numbers in the matrix constitute the turn-on sequence.

The conversion of data from the band buffer into halftone dots on the printer is accomplished by the halftone generator 14. At any time, the x/y position of the current pixel is applied to the reference generator 16, which may be a table lookup or the like, and a digital value is generated. A simple example of the threshold values corresponding to the x/y values is shown in FIG. 2. The comparator compares the reference value and the digital value received from the computer 10, and generates a "1" or a "0", which the printer then uses to print, or not to print, a pixel of the current color. Using the pattern of FIG. 2, and providing identical patterns above and below the one shown, it is clear that the visible axes that will be formed when the dots are connected are 0 and 90 degrees.

Figure 3:
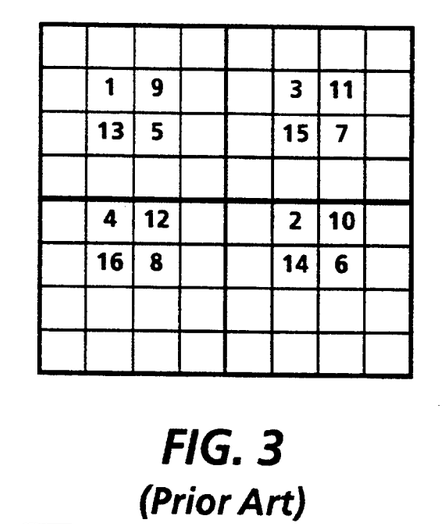
FIG. 3 is an example of a square cell with four dots and with axes at 0 and 90 degrees.

Multicentered cells also have been used. FIG. 3 is a halftone pattern which will generate four centers, or dots, within itself, at 0 and 90 degree angles.

Figure 4:
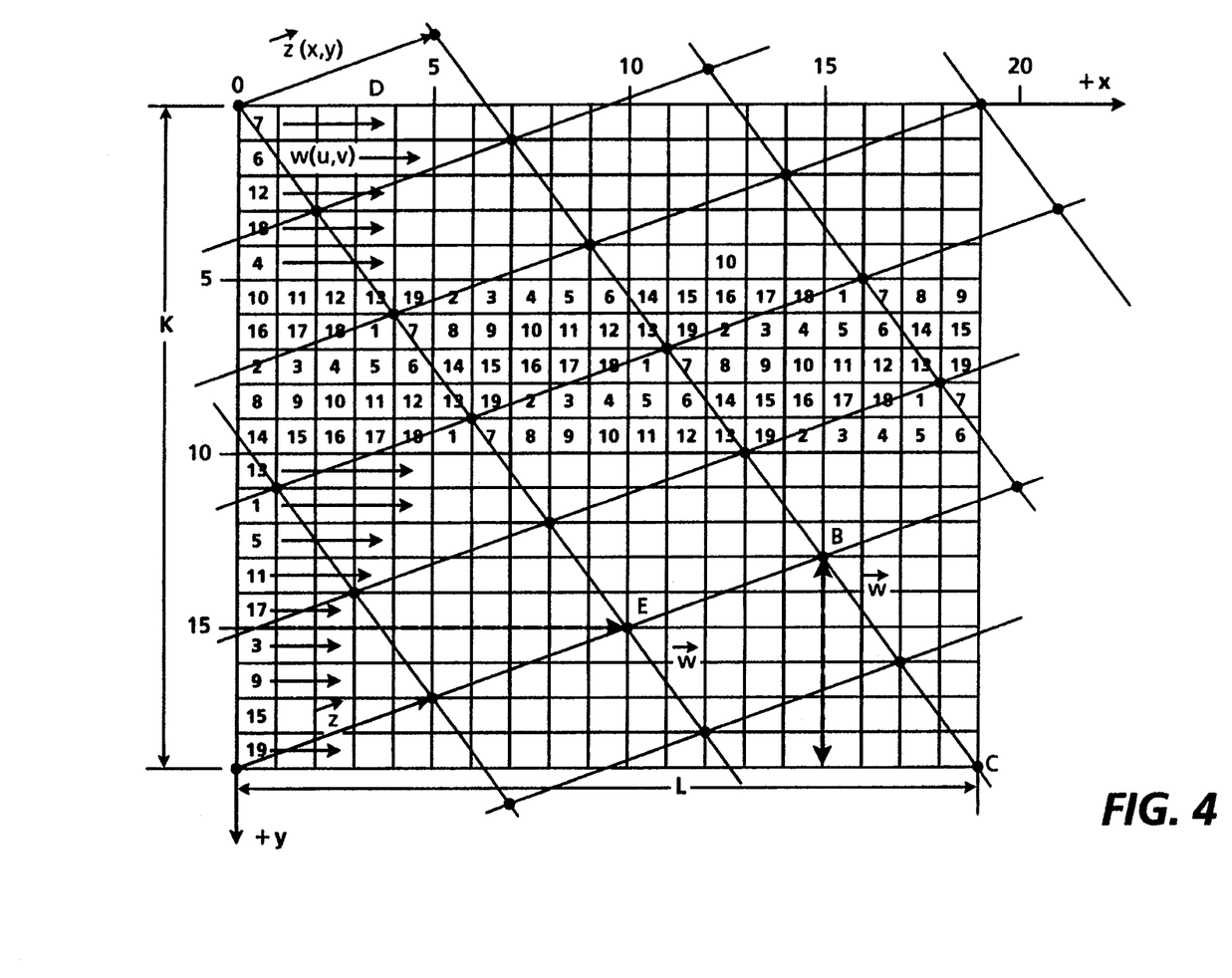
FIG. 4 is an example of a non-square cell.

As stated above, for 4 color systems, besides this 0 degree angle, angles of 15, 45 and 75 degrees are also needed. FIG. 4, which is described in detail in the Holladay patent, is an example of how axes at various angles may be created.

Figure 5:
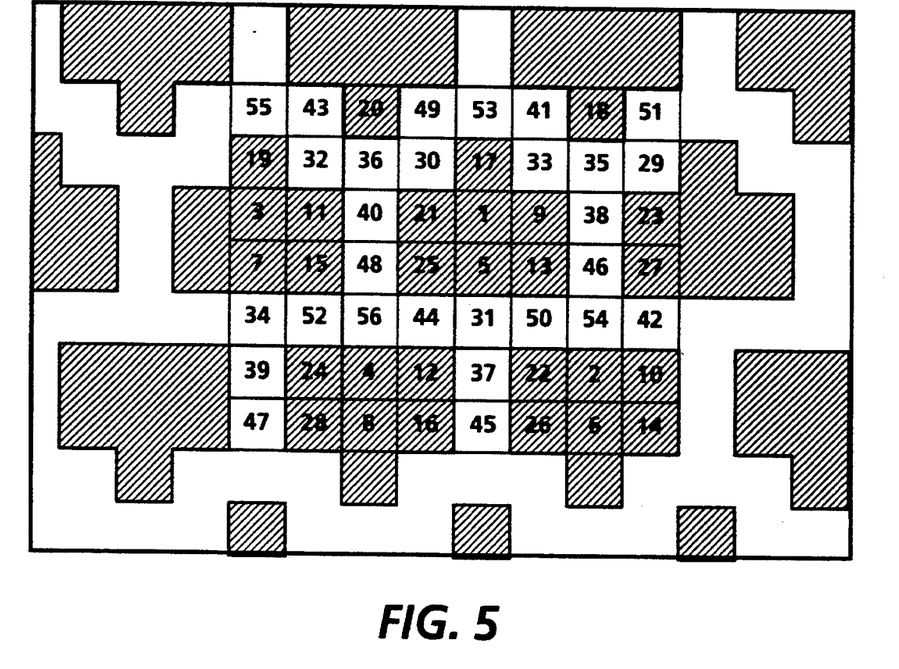
FIG. 5 is an 8×7 pixel halftone cell with four dots and angles of 0, +60 and −60 degrees.

This invention is a specific combination of three of these prior art patterns for the three dominant colors and one new pattern for yellow having four centers and three angles of 0, +60 and −60 degrees. An example of this new dot pattern, as described in Holladay terms, consists of 56 levels in a rectangular brick 8 pixels by 7 pixels having the following turn on sequence:

55,43,20,49,53,41,18,51,
19,32,36,30,17,33,35,29,
3,11,40,21,1,9,38,23,
7,15,48,25,5,13,46,27,
34,52,56,44,31,50,54,42,
39,24,4,12,37,22,2,10,
47,28,8,16,45,26,6,14.

This will generate a hexagonal dot pattern with the pattern of turn-on sequence shown in FIG. 5. Here, the first 28 levels in the turn-on sequence are highlighted. The result is a screen where the highest visual repeat pattern has angles of 0° and ±60°, and a frequency of 86.2 lines per inch when used with 300 pixels per inch resolution.

Figure 6:
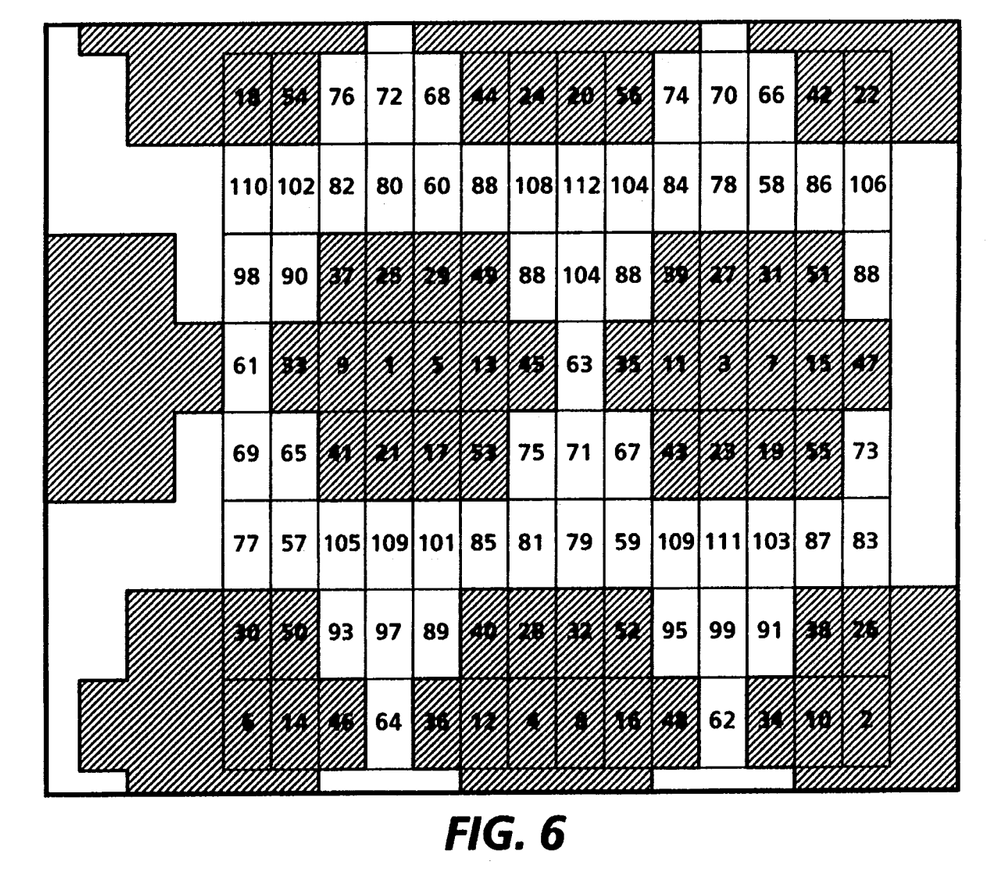
FIG. 6 is a 14 by 8 pixel halftone cell having four dots and angles of 0, +60 and −60 degrees.

A Holladay dot pattern for a 300×600 pixel per inch pattern consists of 112 levels in a rectangular brick 14 pixels by 8 pixels having the following turn on sequence;

18,54,76,72,68,44,24,20,56,74,70,66,42,22,
110,102,82,80,60,88,108,112,104,84,78,58,86,106,
98,90,37,25,29,49,96,100,92,39,27,31,51,94,
61,33,9,1,5,13,45,63,35,11,3,7,15,47,
69,65,41,21,17,53,75,71,67,43,23,19,55,73,
77,57,105,109,101,85,81,79,59,107,111,103,87,83,
30,50,93,97,89,40,28,32,52,95,99,91,38,26,
6,14,46,64,36,12,4,8,16,48,62,34,10,2.

This will generate a hexagonal dot pattern with the pattern of turn-on sequence shown in FIG. 6. The first 56 levels in the turn-on sequence are highlighted. The result is a screen where the highest visual repeat pattern has angles of 0° and ±60°, and a frequency of 86.2 lines per inch when used with 300×600 pixels per inch resolution.

Figure 7:
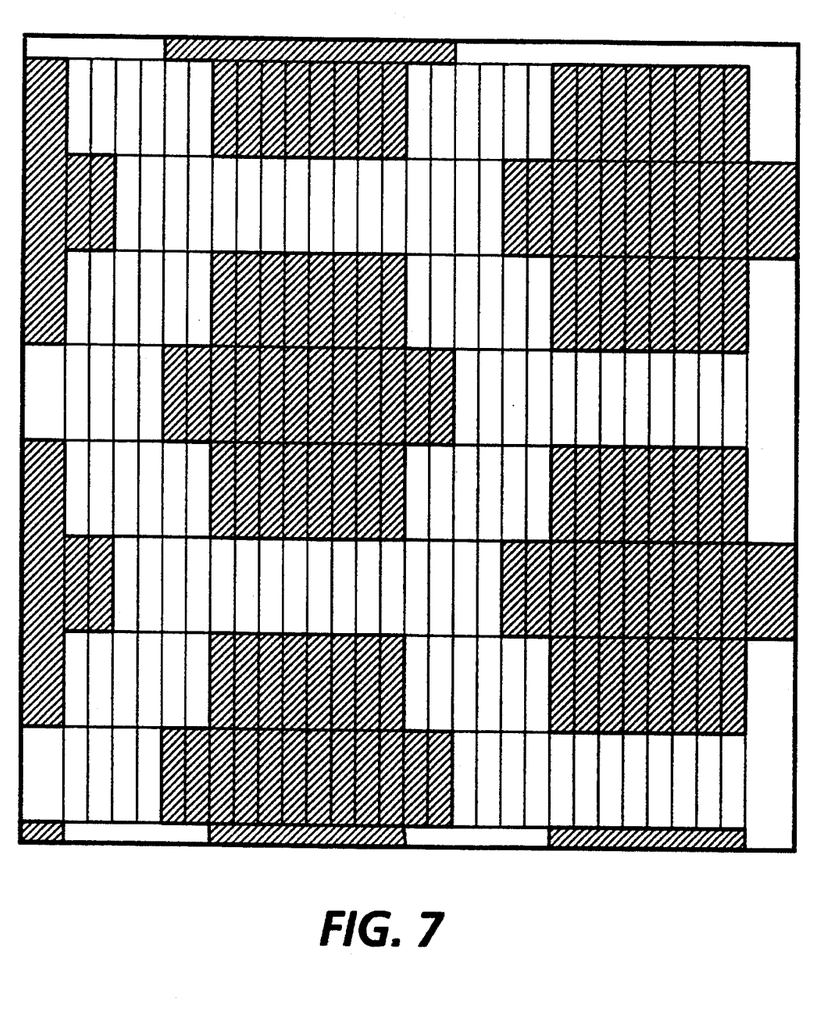
FIG. 7 is a 28 by 8 pixel halftone cell having four dots and angles of 90, +30 and −30 degrees.

A Holladay dot pattern for 300×1200 pixel per inch digital printing consists of 224 levels in a rectangular brick 28 pixels by 8 pixels having the following turn on sequence;

29,159,163,151,140,124,100,84,60,36,44,72,88,108,128-,168,156,148, 33,117,93,77,53,29,45,73,89,109,
61,101,171,179,187,195,203,211,219,223,215,207,199,-191,183,175,143, 113,65,49,25, 17,9,1,5,13,21,37,
125,165,153,145,134,118,94,78,54,30,46,74,90,110,130-,160,164,152,137, 121,97,81,57,33,41,69,85,105,
184,176,144,114,66,50,26,18,10,2,6,14,22,38,62,102,17-2,180,188,196, 204,212,220,224,216,208,200,192,
131,157,161,149,138,122,98,82,58,34,42,70,86,106,126-,166,154,146,135, 119,95,79,55,31,47,75,91,111,
63,103,169,177,185,193,201,209,217,221,213,205,197,-189,181,173,141, 115,67,51,27,19,11,3,7,15,23,39,
127,167,155,147,136,120,96,80,56,32,48,76,92,112,132-,158,162,150,139, 123,99,83,59,35,43,71,87,107,
182,174,142,116,68,52,28,20,12,4,8,16,24,40,64,104,17-0,178,186,194,202, 210,218,222,214,206,198,190.

This will generate a hexagonal dot pattern with the pattern of turn-on sequence shown in FIG. 7. The first 112 levels in the turn-on sequence are highlighted. The result is a screen where the highest visual repeat pattern has angles of 90° and ±30°, and a frequency of 86.2 lines per inch when used with 300×1200 pixels per inch resolution.

Figure 8:
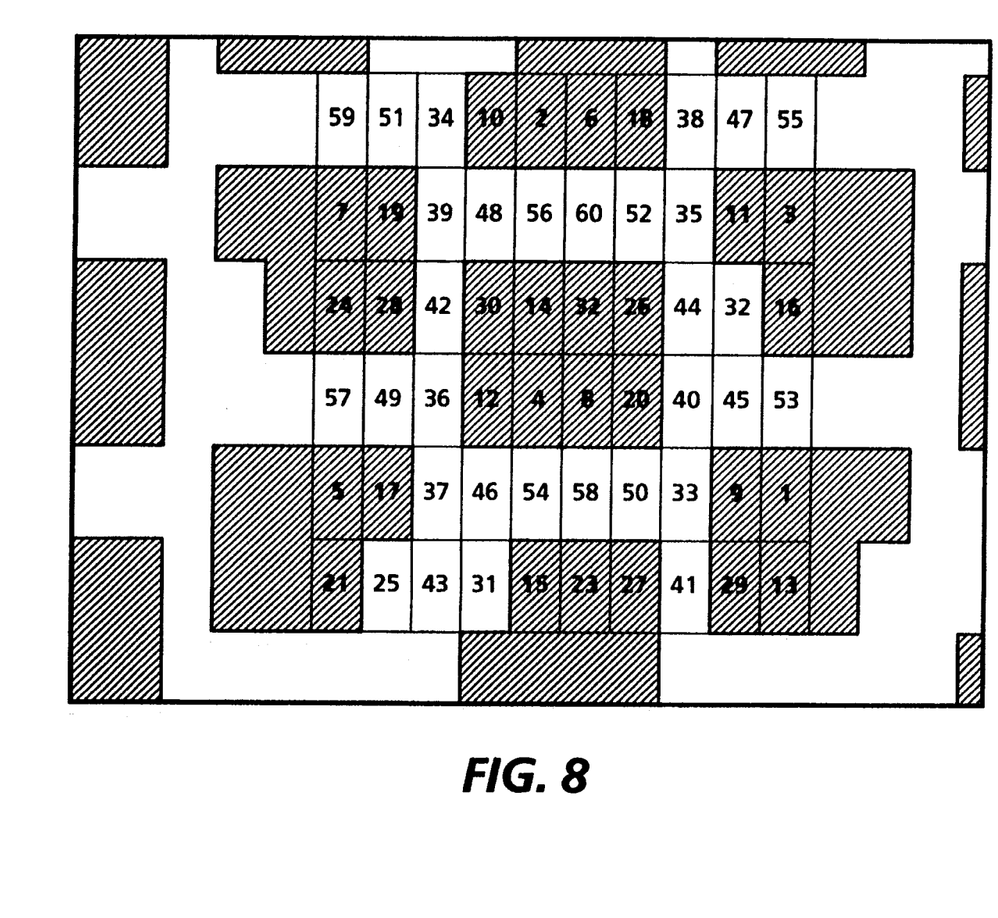
FIG. 8 is a 10 by 6 pixel halftone cell having four dots and angles of 90, +30 and −30 degrees.

Another Holladay dot pattern appropriate for 300×600 pixels per inch digital printing consists of 60 levels in a rectangular brick 10 pixels by 6 pixels having the following turn on sequence:

59,51,34,10,2,6,18,38,47,55,
7,19,39,48,56,60,52,35,11,3,
24,28,42,30,14,22,26,44,32,16,
57,49,36,12,4,8,20,40,45,53,
5,17,37,46,54,58,50,33,9,1,
21,25,43,31,15,23,27,41,29,13.

This will generate a hexagonal dot pattern with the pattern of turn-on sequence shown in FIG. 8. The first 30 levels in the turn-on sequence are highlighted. The result is a screen where the highest visual repeat pattern has angles of 90° and ±30°, and a frequency of 117.7 lines per inch when used with 300×600 pixel per inch resolution.

Figure 9:
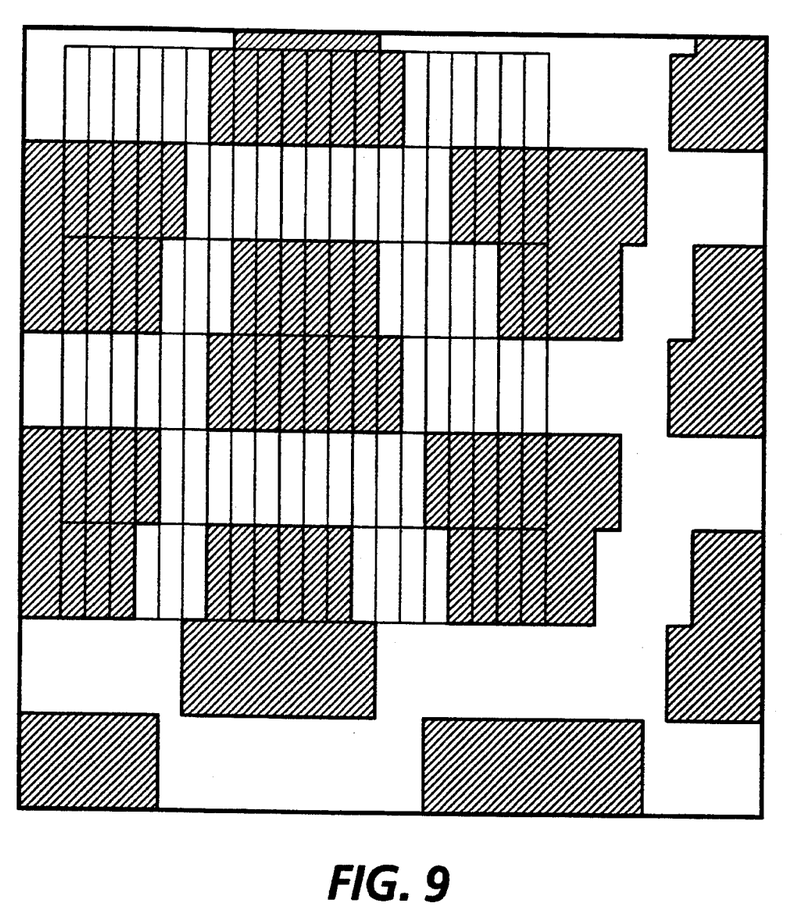
FIG. 9 is a 21 by 6 pixel halftone cell having four dots and angles of; 90, +30 and −30 degrees.

Another Holladay dot pattern appropriate for 300×1200 pixel per inch digital printing consists of 126 levels in a rectangular brick 21 pixels by 6 pixels having the following turn on sequence;

121,113,105,97,89,82,55,27,19,11,3,7,15,23,47,85,93,1-01,109,117,125,
4,8,16,24,48,86,94,102,110,118,126,122,114,106,98,90,-76,56,28,20,12,
32,36,44,60,68,77,69,61,49,37,29,33,41,57,65,73,80,72,-64,52,40,
119,111,103,95,87,81,53,25,17,9,1,5,13,21,45,83,91,99,-107,115,123,
6,14,22,46,74,84,92,100,108,116,124,120,112,104,96,8-8,54,26,18,10,2,
34,42,58,66,79,75,71,63,51,39,31,35,43,59,67,78,70,62,-50,38,30.

This will generate a hexagonal dot pattern with the pattern of turn-on sequence shown in FIG. 9. In this figure the first 61 levels in the turn-on sequence are highlighted. The result is a screen where the highest visual repeat pattern has angles of 90, +30 and −30 degrees, and a frequency of 114.9 spots per inch when used with 300×1200 pixels per inch resolution.

While the patterns produce excellent results when used with 300 line per inch laser xerography, they are also useful at other resolutions such as 240, 400 and 600 lines per inch and higher, and with other printing technologies such as ink jet, thermal, and standard lithography.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. The process of printing an image stored in a buffer onto a medium, each image comprising a plurality of pixels, each pixel having four colors, each color being defined by a number which describes the density of one color of a pixel, and each pixel having an x and y value describing a position of the pixel in the image, the entire image being printed in each color before going on to the next color, comprising the steps of:

producing a halftone reference level from the x and y values of each pixel to be printed,     comparing said density number to said halftone reference level to produce an output bit, and     in response to a output bit, using said printer to print a pixel on said medium,     wherein, for three colors of said image, said halftone reference levels are of the levels necessary to generate a halftone screen having two axes at right angles to each other for each color, each of the resulting six axes being separated by 30 degrees from the nearest of said six axes, and     wherein, for the fourth color of said image, said halftone reference levels are of the levels necessary to generate a halftone screen having three axes, each of said three axes being 60 degrees apart, from the nearest of said three axes each of said three axes being separated by 15 degrees from the nearest of said six axes of said three colors.

2. The process of claim 1 wherein said fourth color is yellow.

* * * * *